United States Patent
Stockmaster

(10) Patent No.: US 11,255,977 B2
(45) Date of Patent: Feb. 22, 2022

(54) SYSTEMS FOR AND METHODS OF NULLSTEERING IN A RECEIVER

(71) Applicant: Rockwell Collins, Inc., Cedar Rapids, IA (US)

(72) Inventor: Michael H. Stockmaster, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 311 days.

(21) Appl. No.: 16/457,497

(22) Filed: Jun. 28, 2019

(65) Prior Publication Data

US 2020/0408922 A1  Dec. 31, 2020

(51) Int. Cl.
*G01S 19/22* (2010.01)
*G01S 19/10* (2010.01)
*G01S 19/24* (2010.01)
*H04B 7/06* (2006.01)

(52) U.S. Cl.
CPC .............. *G01S 19/22* (2013.01); *G01S 19/10* (2013.01); *G01S 19/243* (2013.01); *H04B 7/0617* (2013.01)

(58) Field of Classification Search
CPC ... G01S 19/21–22; G01S 19/36; H04B 7/086; H01Q 3/24–247
See application file for complete search history.

(56) References Cited

U.S. PATENT DOCUMENTS

| | | | |
|---|---|---|---|
| 6,784,831 B1 * | 8/2004 | Wang | G01S 19/21 342/357.63 |
| 6,959,057 B1 * | 10/2005 | Tuohino | G01S 19/29 375/325 |
| 2006/0227905 A1 | 10/2006 | Kunysz et al. | |

FOREIGN PATENT DOCUMENTS

| | | | |
|---|---|---|---|
| EP | 2589983 A1 | 5/2013 | |
| WO | WO-2007090785 A1 * | 8/2007 | ............ H01Q 3/242 |

OTHER PUBLICATIONS

S. Soliman, GNSS Receiver Sensitivity Enhancement in Wireless Applications, IEEE MTT-S International Topical Symposium on Technologies for Wireless Applications, p. 181-186, Feb. 1999 (Year: 1999).*
English translation of WO 2007/090785 A1 (Year: 2021).*
Extended Search Report for European Application No. 20000207.9 dated Oct. 28, 2020, 8 pages.
Min Li et al. "A GNSS Software Receiver Beamforming Architecture", International Symposium on GPS GNSS, Odaiba, Tokyo, Nov. 11, 2008, pp. 904-909 XP002671809.

* cited by examiner

*Primary Examiner* — Bernarr E Gregory
*Assistant Examiner* — Fred H Mull
(74) *Attorney, Agent, or Firm* — Suiter Swantz pc llo

(57) ABSTRACT

A receiver for null steering in a navigation or positioning system includes a controlled reception pattern antenna (CRPA) comprising elements, a switch array coupled to the elements of the CRPA, and a receiver circuit. The receiver circuit is configured to receive an incoming radio frequency (RF) satellite signal from the switch array. The receiver circuit is configured to control the switch array to receive digitized samples, wherein each sample is in a respective time interval for each element of the CRPA elements. The receiver circuit is configured to apply a weight value to each sample and sum the samples to provide a null steering beam.

18 Claims, 3 Drawing Sheets

SYSTEMS FOR AND METHODS OF NULLSTEERING IN A RECEIVER

BACKGROUND

The inventive concepts disclosed herein relate generally to the field of navigation or positioning systems. More particularly, embodiments of the inventive concepts disclosed herein relate to systems and methods for enhanced signal assurance in receivers for global navigational satellite systems (GNSS) and receivers for local positioning systems.

Global navigational satellite systems (GNSS) refer to a variety of satellite navigation systems used for providing autonomous geo-spatial positioning. These satellite navigation systems include, for example, the global positioning system (GPS), the Russian global orbiting navigational satellite system (GLONASS), the European satellite navigation system Galileo, the Chinese satellite navigation systems BeiDou, and other global or regional systems. Each satellite navigation system can include a constellation of satellites deployed in orbits around the earth that continuously transmit positioning signals. The constellation of satellites can transmit radio frequency (RF) positioning signals over various frequency bands. For example, GPS satellites can transmit L1-band positioning signals having a center frequency of 1575.42 MHz, L2-band positioning signals with a center frequency of 1227.6 MHz, and L5-band positioning signals with a center frequency of 1176.45 MHz. Distinct frequency bands may be associated with different types of navigation or positioning applications, e.g., civil or military navigation.

Generally, GNSS signals are low power and are prone to interference caused from a variety of sources, for example, such as radio emissions, intentional or unintentional jamming, naturally occurring conditions (e.g., space weather, magnetized materials, or the like), government testing, spoofing, or the like. Interference on the GNSS signals can cause difficulties and/or inaccuracies in determining location information or other navigation data from the GNSS signal in a GNSS receiver. Spoofing causes difficulties and/or inaccuracies by masquerading as a GNSS signal, but with false or incorrect navigation data which can cause a GNSS receiver to calculate false or incorrect location (or position) information.

Enhanced signal assurance can be achieved by steering (e.g., null steering). Steering is achieved by implementing spatial processing in certain receivers. Null steering is a form of spatial processing that steers nulls in desired directions as requested by the user or a back-end processing unit such as in a GNSS receiver. Spatial processing conventionally requires the use of a controlled reception pattern antenna (CRPA) to sample the environment spatially and antenna electronics (AE) to process the outputs of the CRPA to generate a modified antenna pattern. The modified antenna pattern in general is significantly different than the pattern of the individual antenna elements in the CRPA. The antenna electronics needed to achieve the modified pattern tend to be expensive, add weight, and consume a significant amount of power.

SUMMARY

In one aspect, the inventive concepts disclosed herein are directed a receiver for null steering in a navigation or position system. The receiver includes a controlled reception pattern antenna comprising elements, a switch circuit coupled to the elements of the controlled reception pattern antenna, and a receiver circuit. The receiver circuit is configured to receive an incoming radio frequency (RF) satellite signal from the switch circuit. The receiver circuit is configured to control the switch circuit to receive samples, wherein each sample is in a respective time interval for each element of the elements. The receiver circuit is configured to apply a weight value to each sample and sum the samples to provide a null steering beam.

In some embodiments, the receiver achieves enhanced signal assurance by processing before signal integration detection without using additional antenna hardware for spatial processing.

In another aspect, the inventive concepts disclosed herein are directed to a method. The method includes receiving, by a controlled reception pattern antenna, an incoming radio frequency (RF) signal for a positioning operation. The method also includes switching the elements of the controlled reception pattern antenna synchronous with the time epochs in a given tracking channel in the GNSS receiver. The method also includes integrating the digitized samples in the GNSS tracking channel, wherein each sample is associated with a respective CRPA element and is integrated over a respective time interval. The method also includes weighting each respective sample to provide a null steering beam, wherein the weighting is implemented prior to pre-detection integration operation.

In another aspect, the inventive concepts disclosed herein are directed a system for use in a global navigation satellite system. The system includes an array of antenna elements and a processing circuit. The processing circuit is configured to synchronously switch the antenna elements to an RF downconverter channel and subsequently digitized by the analog to digital converter. The processing circuit is configured to process the digitized samples provided on the channel, wherein each sample is in a respective time interval for each element of the elements. The processing circuit is configured to apply a weight value to each sample and sum the samples to provide a steered beam.

In some embodiments, the summing is performed during pre-detection integration. Each interval is 1 milliseconds, and the pre-detection interval is 20 milliseconds.

In some embodiments, the system further includes a switch array and a single channel RF downconverter between the processing circuit and the array of antenna elements.

DETAILED DESCRIPTION

Figure 1:
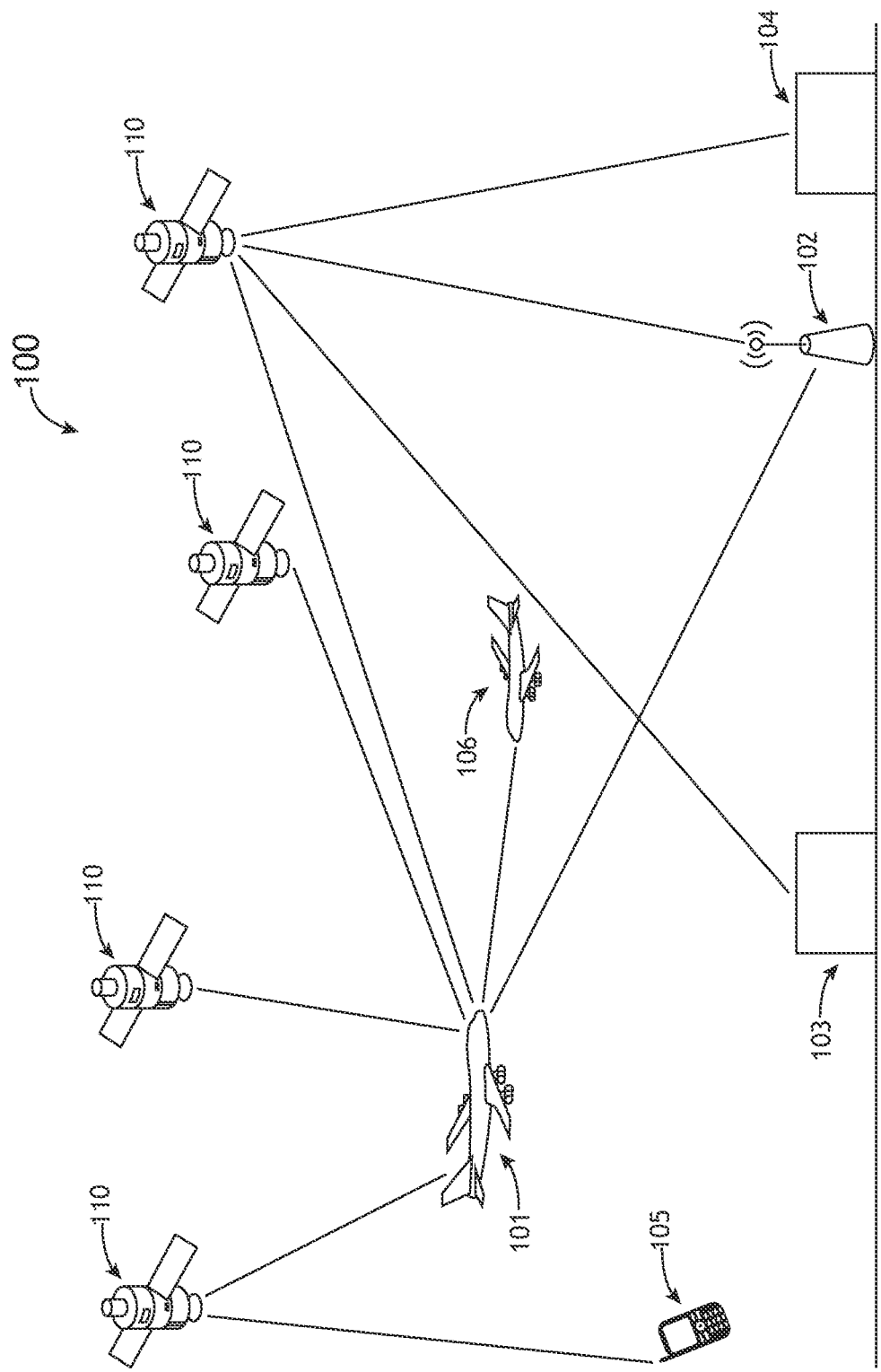
FIG. 1 is a schematic diagram of a communication network for GNSS communications, according to certain exemplary inventive concepts.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, some embodiments of the inventive concepts disclosed herein are directed to systems for and methods of steering (e.g., null steering) without requiring antenna electronics that are expensive or consume significant amounts of power. In some embodiments, the systems and methods control the effective antenna pattern to generate nulls in a desired direction or directions. In some embodiments, the systems and methods weight in some fashion and combine outputs of the CRPA to achieve null steering. In some embodiments, a combination process uses high speed digital data associated with each CRPA element with weight update rates of 1-10 kHz or faster. Data is present simultaneously on each of the CRPA outputs for the combination process in some embodiments. In some embodiments, gain is enhanced in specific directions using simultaneous combination in addition to modifying the antenna pattern in general. In some embodiments where pattern modification is more important and gain modification is less important, simultaneous data from each of the CRPA outputs is not utilized.

The inventive concepts disclosed herein can be utilized in a number of control systems for various types of electronic avionics applications for airborne platforms (e.g., aircraft), including but not limited to flight control and autopilot systems, navigation systems, flight display systems, communications systems, radar systems, electric power systems, engine control systems, monitor warning systems, and/or the like. In some embodiments, the systems and methods are utilized in navigation systems for low-end applications which generally do not have anti jamming protection due to cost. The systems and methods can be used in applications including but not limited to defense advanced GPS receiver (DAGR)/micro product lines, NavStrike products, airborne selective availability anti-spoofing module (SAASM) (ASR)/GPS embedded module (GEM), GNSS/Qinetic products, and commercial positioning and navigation offerings. While the inventive concepts disclosed herein are described in connection with systems and methods implementable for a platform, the inventive concepts disclosed herein may be used in any type of environment (e.g., in another aircraft, a spacecraft, an autonomous vehicle, a ground-based vehicle, a weapon, ordinance, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system, a portable electronic device, a hand-held location tracking device, and/or the like). The systems and methods described herein may be implemented for GPS/GNSS communications, or other signal processing devices, which can benefit from enhanced signal assurance.

In some embodiments, a receiver device includes a radio frequency receiver and one or more processors. The radio frequency receiver is configured to receive an incoming radio frequency (RF) signal, which may include an RF satellite signal from a satellite vehicle. The radio frequency receiver is also configured to process the signal using synchronous switching to antenna elements and synchronous weighting.

Systems manufactured in accordance with the inventive concepts disclosed herein can improve the operations of GNSS receiver hardware (including GPS receiver electronics) and various monitoring and reporting systems, as well as portable electronic devices or aircraft or other airborne platforms including GNSS receiver hardware, by improving signal assurance. These improvements can allow for more accurate positioning, navigation, targeting, and/or monitoring applications. Systems manufactured in accordance with the inventive concepts disclosed herein can be used with terrestrial sources, such as pseudolites, local area augmentation systems (LAAS), etc. and Iridium and wide area augmentation system (WAAS) networks.

Referring now to FIG. 1, a network 100 is shown according to an exemplary embodiment of the inventive concepts disclosed herein. The network 100 includes various platforms including an airborne platform 101, a ground-based (e.g., stationary) platform 102, a mobile ground platform 103, a maritime platform 104, and/or a portable electronic device 105 (e.g., handheld device). It will be appreciated that various other communication devices may be included in the network 100 so as to communicate with the one or more satellite vehicles 110. The various platforms can be configured to transmit/receive (e.g., via one or more receiver/transmitter/transceiver hardware devices) radio frequency signals to/from various remote sources. The platforms can receive incoming signals (e.g., radio frequency signals such as GNSS/GPS signals) from one or more satellite vehicles 110 along various lines of sight. The platforms can receive signals from other platforms; for example, as shown in FIG. 1, the airborne platform 101 is configured to receive signals from remote sources, such as the ground-based platform 102 (e.g., a ground station) and from one or more remote airborne platforms 106. The lines of sight to the various remote sources may overlap. As the platforms (e.g., airborne platform 101) change in position and/or orientation relative to the remote sources, the platforms may lose or have to reset tracking of the signals. Radio frequency signals may be reflected by various platforms or the ground, complicating tracking of the remote sources. Similarly, in a multi-path environment, such as an urban environment for communication with portable electronic devices, each signal may be received by the platforms along two or more paths.

Figure 2:
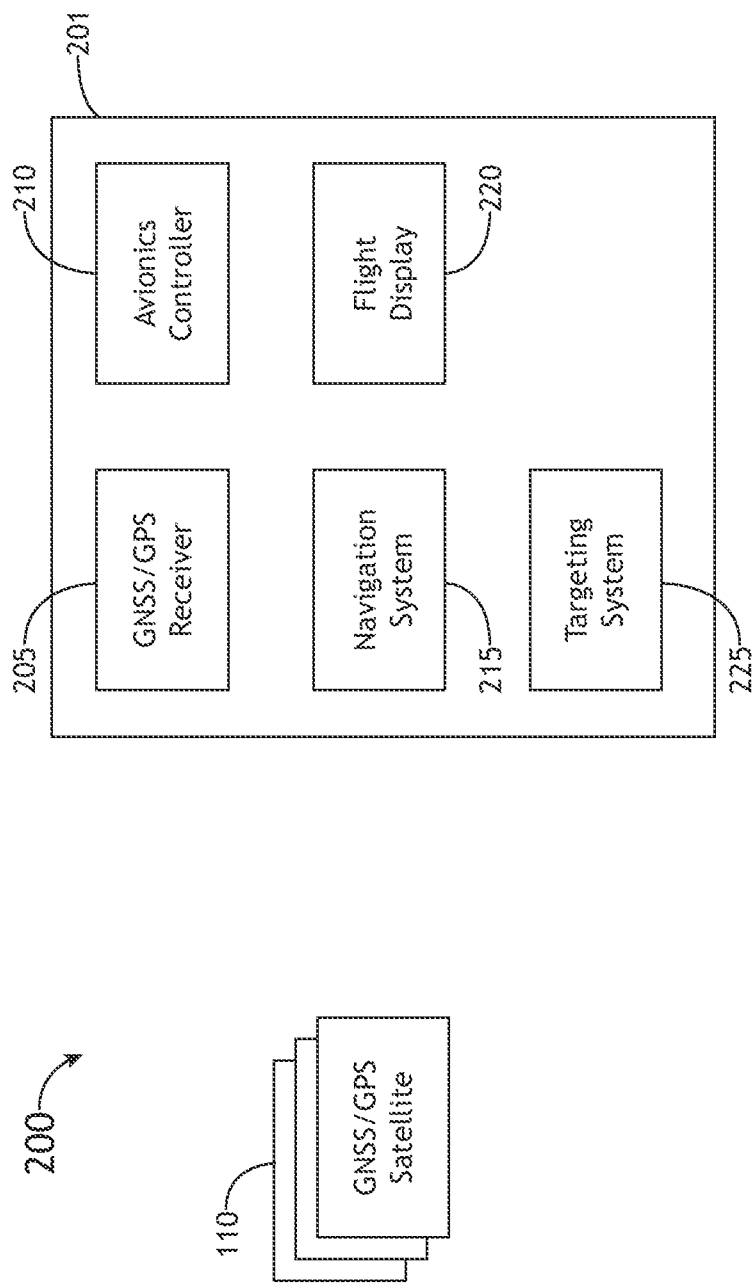
FIG. 2 is a block diagram of a system for GNSS communications, according to certain exemplary inventive concepts.

Referring now to FIG. 2, a block diagram of a system 200 is shown according to an exemplary embodiment of the present disclosure. The system 200 can be part of the network 100 (FIG. 1) and configured to calculate a range to one or more satellite vehicles 110 (e.g., GNSS satellite vehicles), such as for determining the location of a vehicle 201 or an electronic device associated with the vehicle 201. In various embodiments, the vehicle 201 can be any suitable vehicle, platform, or device that uses GNSS/GPS based location tracking. For example, the vehicle 201 can be the airborne platform 101, the ground-based (e.g., stationary) platform 102 (e.g., a ground station), the mobile ground platform 103, the maritime platform 104, the portable electronic device 105 (e.g., handheld device) described with reference to FIG. 1, and/or any other suitable vehicle, platform, or device. For convenience, the vehicle 201 is described below in the context of the airborne platform 101. In this case, the vehicle 201 includes a GNSS receiver 205 (e.g., a GPS receiver), an avionics controller 210, a navigation system 215, a flight display 220, and a targeting system 225. However, the present disclosure is not limited thereto, and as noted above, the inventive concepts disclosed herein may be implemented in various platforms including ground-based platforms or portable electronic devices. For example, the avionics controller 210 in various embodiments may be configured as a controller specific to the platform implemented on the vehicle 201, and/or one or more component shown in FIG. 2 can be omitted or variously modified depending on the type of vehicle, platform, or device.

One or more components of the vehicle 201 (e.g., GNSS receiver 205, avionics controller 210) may include a processing circuit. The processing circuit (e.g., control circuits, processing electronics) can include a processor and memory. The processor may be implemented as a specific purpose processor, an application specific integrated circuit (ASIC), one or more field programmable gate arrays (FPGAs), a group of processing components, or other suitable electronic processing components. The memory is one or more devices (e.g., RAM, ROM, flash memory, hard disk storage) for storing data and computer code for completing and facilitating the various user or client processes, layers, and modules described in the present disclosure. The memory may be or include volatile memory or non-volatile memory and may include database components, object code components, script components, or any other type of information structure for supporting the various activities and information structures of the inventive concepts disclosed herein. The memory is communicably connected to the processor and includes computer code or instruction modules for executing one or more processes described herein. The memory includes various circuits, software engines, and/or modules that cause the processor to execute the systems and methods described herein.

In some embodiments, the GNSS receiver 205 is configured to receive incoming signals including radio frequency satellite signals from the one or more satellite vehicles 110. The GNSS receiver 205 can include one or more antennas (e.g., a CRPA) configured to receive radio frequency signals. The GNSS receiver 205 can be configured to execute computational processes on the received radio frequency signals, including determining a location associated with the GNSS receiver 205 based on processing one or more received radio frequency signals. The GNSS receiver 205 can execute signal tracking channels which correlate the received radio frequency signals to predetermined code signals in order to calculate pseudo range values (e.g., code position measurements, carrier phase measurements, and/or the like) corresponding to each satellite vehicle 110. The GNSS receiver 205 can be configured to generate and output position data regarding the determined location associated with the GNSS receiver 205 using the pseudo range values.

In some embodiments, the GNSS receiver 205 is configured to provide null steering using pre-detection integration processing. In some embodiments, the GNSS receiver 205 is configured to synchronously switch elements of a CRPA to a channel and synchronously apply weights to the samples on the channel to achieve steering (null steering) without significant additional antenna electronics. In some embodiments, the GNSS receiver 205 is configured to detect a multipath signal by steering a null toward the satellite to verify which direction is the true satellite signal and detecting the location of the multipath signal by steering the null around spatially until the GNSS tracking of the multipath signal is lost. In some embodiments, the GNSS receiver 205 steers the null toward the detected location of the multipath signal to increase signal assurance as the receiver 205 receives processes the signal from the satellite vehicle 110 to obtain position data.

The navigation system 215 can use the position data to execute navigation functions. For example, the navigation system 215 can use the position data to display a location of the vehicle 201 to update a flight plan, to calculate distances and ranges to remote locations or targets, to calculate state data (e.g., speed, heading), and/or the like.

In accordance with GNSS protocols, each satellite vehicle 110 may transmit or broadcast a signal (e.g., radio frequency signals such as GNSS/GPS signals). The signal may have a carrier frequency, a wavelength, an encoding, and a modulation, among other characteristics as specified by the GNSS protocol. The carrier frequencies may be a multiple of a fundamental frequency set by the GNSS protocol. In some embodiments, the fundamental frequency may be 10.23 MHz. The messages encoded in the signal may include a status message and ephemeris data. The ephemeris data may indicate a position of the satellite vehicle 110 in orbit around the Earth. In some embodiments, the signal transmitted by the satellite vehicle 110 may be an L1 GPS signal, and may have a carrier frequency of 1575.42 MHz (10.23 MHz×154) and a wavelength of 19.0 cm. In some embodiments, the signal transmitted by the satellite vehicle 110 may be a L2 GPS signal, and may have a carrier frequency of 1227.60 MHz (10.23 MHz×120) and a wavelength of 24.4 cm. In some embodiments, the signal transmitted by the satellite vehicle 110 may be, for example, a L5 GPS signal having a carrier frequency of 1176.45 MHz (10.23 MHz×115) and a wavelength of 25.48 cm. However, in other embodiments, the signal may be any suitable GNSS/GPS signal transmitted or otherwise broadcast by the satellite vehicle 110.

The GNSS receiver 205 may obtain pseudo range measurements and carrier phase measurements for the one or more satellite vehicles 110 within the range (or view). The pseudo range measurement may be an approximated distance from the antenna of the GNSS receiver 205 to the satellite vehicle 110 corresponding to the received signal. The carrier phase measurement may be a number of cycles in the signal between the antenna of the GNSS receiver 205 and the satellite vehicle 110 corresponding to the received signal. In some embodiments, the pseudo range measurements and carrier phase measurements may be obtained by the GNSS receiver 205 at measurement epochs. The measurement epoch may be a sampling interval for obtaining the pseudo range measurements and carrier phase measurements of the signals of the satellite vehicles 110 within the range received via the GNSS receiver 205. In some embodiments, the sampling interval may range from a few hundredths of a second to hours.

The GNSS receiver 205 includes receiver electronics, one or more processors, and memory. The processors may be configured to execute computer code and/or program instructions stored in the memory or received from other computer readable media (e.g., CDROM, network storage, a remote server, etc.). The processors can be implemented on one or more processing circuits using various electronic components similar to those described with reference to FIG. 2. For example, in some embodiments, the processors may include a microprocessor unit, an application-specific integrated circuit (ASIC), and/or a field-programmable gate array (FPGA), among others. The processors may also be a multi-core processor or an array of processors. The memory may include electronic, optical, magnetic, or any other storage device capable of relaying or providing the processor with program instructions. The memory may include, for example, a floppy disk, CD-ROM, DVD, magnetic disk, memory chip, Static random access memory (SRAM), Burst SRAM or SynchBurst SRAM (BSRAM), Dynamic random access memory (DRAM), Ferroelectric RAM (FRAM), NAND Flash, NOR Flash, and Solid State Drives (SSD), among others, or any combination thereof. The program instructions may include code from any programming language, such as C, C++, C#, Java, JavaScript, Perl, HTML, XML, Python, Visual Basic, et cetera, or any combination thereof. The processors and components thereof can execute the functions described herein.

Figure 3:
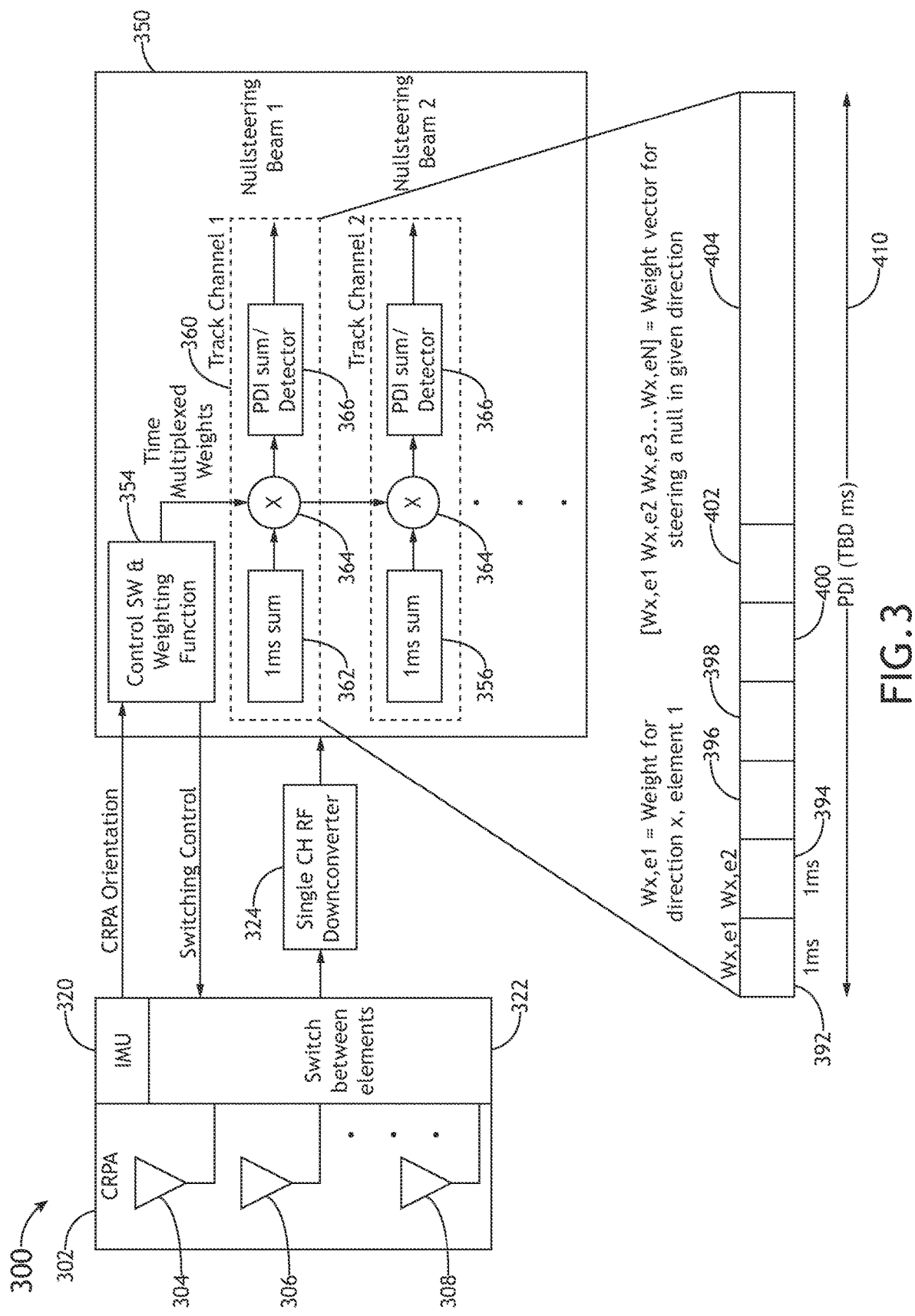
FIG. 3 is block diagram of a GNSS receiver with enhanced signal assurance according to certain exemplary inventive concepts.

With reference to FIG. 3, a GNSS receiver system 300 includes a CRPA 302, an inertial measurement unit (IMU) 320, a switch array 322, a single channel downconverter 324, and a receiver or processing circuit 350. The GNSS system 300 can be utilized as the GNSS receiver 205 illustrated in FIG. 1. In some embodiments, the processing circuit 350 and the switch array 322 operate to sample the spatial environment and apply a weighting algorithm to provide an antenna pattern using summing without enhanced gain. In some embodiments, the GNSS receiver system 300 is a 10 to 60 Watt receiver. In some embodiments, the IMU 320 is a sensor or module capable of providing an attitude indication for the CRPA 302.

The CRPA 302 includes a number of antenna elements 304, 306 and 308 arranged in a linear, a two dimensional, or three dimensional array. The number of elements 304, 306, and 308 is an integer from 2 to N. The elements 304, 306, and 308 can be arranged in a variety of fashions. The elements can be circuit board elements or other structures for receiving GNSS signals arranged in matrix of a variety of states. Each of the elements 304, 306 and 308 is coupled to the processing circuit 350 via the switch array 322 and the single channel down converter 324. In some embodiments, the channel associated with the single channel down converter 324 is an RF downconverter channel. The RF down converter channel can be coupled to an analog to digital converter (ADC) configured for providing a digital bit stream.

The switch array 322 is a switch circuit controlled by the processing circuit 350 and includes semiconductor or other devices for connecting and disconnecting elements 304, 306, and 308 to the processing circuit 350 via the single channel downconverter 324. In some embodiments, the switch array 322 is controlled to synchronously switch each of the elements 304, 306, and 308 in accordance with a time interval (e.g., 1 millisecond). The switches can be disposed in an array to connect and disconnect individually the elements 304, 306, and 308. The switches in the switch array are RF switches (e.g., micro switches, RF integrated circuit switches, discrete transistors, etc.) in some embodiments. In some embodiments, the interval is less than 1 millisecond and time-based multiplexing for multiple channels is used.

The IMU 320 provides orientation data (e.g., pitch and azimuth) associated with the elements 304, 306, and 308 of the CRPA for use in determining weighting values for appropriate beam steering. The orientation data is provided to the processing circuit 350 which determines the weighting values. The IMU 320 uses multi-axis combinations of precision gyroscopes, accelerometers, magnetometers, and pressure sensors to determine orientation. The IMU 320 is an aircraft IMU is some embodiments. Weight values are determined using geometric relationships between the phase centers of the elements 304, 306, and 308 and the satellite vehicles 110 (FIG. 2). In some embodiments, a look-up table provides the weight values based upon direction and gain.

The single channel down converter 324 is an RF circuit. The single channel down converter 324 down converts the signals received from the elements 304, 306, and 308 to a lower frequency such as a baseband frequency. The single channel downconverter 324 includes one or mixers, filters, and other circuits for converting the signals from the elements 304, 306, and 308 for reception by the processing circuit 350.

The processing circuit 350 is implemented using one or more processors, registers, memory, ASICS, FPGAs as described above. The processing circuit 350 includes a switch control and weighting circuit 354 and a tracking channel 360. The tracking channel 360 is a processing channel for steering beams associated with the signals provided by the single channel downconverter 324. The tracking channel 360 includes an integrator or summer 362, and a multiplier 364. Some embodiments may include a second tracking channel, wherein the second tracking channel comprises a second integrator or summer 356 in some embodiments.

The summer 362 receives the synchronously switched signals or samples from the elements 304, 306, and 308. The summer 362 sums each signal from one of the elements 304, 306, and 308 during a time interval to provide a sample to the multiplier 364 in some embodiments. The time interval is selected by the switch control and weighting circuit 354 in some embodiments. In some embodiments, the time interval is a fixed 1 millisecond interval or epoch. After the interval has expired, the summer 362 sums the signal from the next element of elements 304, 306, and 308 over the switch control and weighting circuit 354. In some embodiments, the switch control and weighting circuit 354 uses the switch array 322 to time division multiplex the signals on the elements 304, 306, and 308 for processing in the channel 360. In some embodiments, the intervals are 2 milliseconds or less.

In some embodiments, the switch control and weighting circuit 354 provides controls signals to the switch array 322 to appropriately switch the elements 304, 306, and 308 to the channel 360 and applies weight values to the multiplier 364. The multiplier 364 multiplies the weight values by the sum value (e.g., the sample) of the summer 362. The multiplier 364 and the summer 362 are RF or baseband circuits configured for multiplying and summing operations.

The weight values are provided to effect a steering operation such as a null steering operation. The switch control and weighting circuit 354 selects the weighting values for the signals from each of the elements 304, 306, and 308 based upon a desired azimuth or elevation. The weight values are provided in synchronism with the sum values, thereby effectively implementing the weight application process at the multiplier 364 in some embodiments. Steering the null towards the satellite vehicles 110 (FIG. 1) verifies that beam that it is tracking the correct satellite in some embodiments. Steering the null around on a different beam tracking the same satellite pseudo-random noise (PRN) or satellite identification, and finding that tracking is lost in a direction that is not the known satellite location shows that the signal being tracked is multipath or some other undesirable copy of the signal in some embodiments.

In some embodiments, the product from the multiplier 364 is provided to a summer/detector 366 which sums or integrates the products across a pre-detection time interval 410 (e.g., 20 milliseconds). The summer/detector 366 provides detection across the pre-detection time interval 410. The summer/detector 366 provides the steered beam (e.g., the null steered beam) for the channel 360 in some embodiments. The data associated with the steered beam is used for position or range determination in accordance with GNSS operations and/or back end GNSS software. The data presented at the detector associated with the summer/detector 366 across the pre-detection time interval 410 advantageously has spatial characteristics determined by the weight values without the use of expensive digital signal processing hardware.

The pre-detection time interval 410 includes intervals 392, 394, 396, 398, 400, 402, and 404. The number of intervals can be from 2 to N and can correlate to the number of elements 304, 304, 306, and 308 of the CRPA 302, where N is an integer greater than 1. The intervals 392, 394, 396, 398, 400, 402, and 404 each include the weighting value from the switch control and weighting circuit 354 multiplied by the sum value from the summer 362 associated with a sample from a particular element (e.g., element 1*weight 1, element 2*weight 2, etc.) and are received and summed by the summer/detector 366. The weights are associated with a direction determined from CRPA orientation in some embodiments. The sum from the summer/detector 366 provides the steered beam in a given direction as directed by the weighting values in some embodiments.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A receiver for null steering in a navigation or position system, the receiver comprising:
a controlled reception pattern antenna (CRPA) comprising elements;
a switch array coupled to the elements of the controlled reception pattern antenna and a receiver circuit;
the receiver circuit configured to receive an incoming radio frequency (RF) satellite signal from the switch array, wherein the receiver circuit is configured to control the switch circuit to receive samples, wherein each sample is in a respective time interval for each element of the elements during a pre-detection integration time interval, the receiver circuit comprising:
a switch control and weighting circuit configured to provide control signals to the switch array to switch the elements, and to provide weight values for each sample to a multiplier;
a summer and a detector coupled to the multiplier and configured to determine a sum value; and
the multiplier configured to synchronously receive the weight value for each sample, and to multiply the weight values by the sum value,
wherein the receiver circuit is configured to apply the weight value to each sample and sum the samples to provide a null steering beam.

2. The receiver of claim 1, wherein the controlled reception pattern antenna further comprises an orientation data sensor configured to provide orientation data of the elements to the switch control and weighting circuit, wherein the weight values are determined from the orientation data of the elements.

3. The receiver of claim 2, wherein each respective time interval for each element of the elements is 1 milliseconds and the pre-detection integration time interval is 20 milliseconds.

4. The receiver of claim 1, further comprising a single channel RF downconverter between the receiver circuit and the switch array.

5. The receiver of claim 4, wherein the multiplier is configured for synchronously receiving the weight value for each sample.

6. The receiver of claim 1, wherein the receiver circuit comprises a plurality of tracking channels, wherein each channel of the channels receives respective samples of the samples, wherein each respective sample is in a respective time interval for each element of the CRPA elements, wherein the receiver circuit is configured to apply a respective weight value to each respective sample and sum the respective samples to provide a respective null steering beam for each channel.

7. The receiver of claim 1, wherein the weight value is provided in accordance with a beam direction.

8. A method comprising:
receiving, by a controlled reception pattern antenna (CRPA) comprising elements, an incoming radio frequency (RF) signal for a positioning operation;
synchronously switching, by a switch array coupled to a switch control and weighting circuit, the elements of the CRPA to a channel of a receiver circuit;
integrating samples received through the channel, wherein each sample is associated with a respective CRPA element and integration of multiple samples occurs over a respective time interval; and
weighting each respective sample to provide a null steering beam, wherein the weighting is implemented prior to the pre-detection integration operation comprising a pre-detection interval,
wherein the switch control and weighting circuit is configured to provide control signals to the switch array to switch the elements, and to provide weight values for each sample to a multiplier;
wherein a summer and a detector are coupled to the multiplier and configured to determine a sum value; and
wherein the multiplier is configured to synchronously receive the weight value for each sample, and to multiply the weight values by the sum value.

9. The method of claim 8, further comprising:
integrating additional samples received through a second channel; and weighting each respective additional sample of the samples to provide another null steering beam.

10. The method of claim 9, wherein the weighting step in claim 8 uses a multiplier for the channel and the weighting step in claim 9 uses a second multiplier for the second channel.

11. The method of claim 9, further comprising:
estimating a current position and a satellite position; and providing the null steering beam toward a desired direction.

12. The method of claim 8, further comprising:
detecting a multipath signal by searching around spatially and steering a beam toward the multipath signal.

13. The method of claim 8, wherein each respective time interval is 1 millisecond and the pre-detection interval is 20 milliseconds.

14. A system for use in a global navigation satellite system, the system comprising: an array of antenna elements; and
a processing circuit configured to synchronously switch the antenna elements to an RF downconverter channel,
wherein the processing circuit is further configured to process digitized samples associated with the channel,
wherein each sample is in a respective time interval for each element of the array of antenna elements,
wherein the processing circuit is further configured to provide weight values for each sample to a multiplier,
wherein the processing circuit comprises a summer and a detector coupled to the multiplier, the summer and the detector configured to determine a sum value,
wherein the multiplier is configured to synchronously receive the weight value for each sample, and to multiply the weight values by the sum value,
wherein the processing circuit is further configured to apply a weight value to each sample and sum the samples to provide a steered beam.

15. The system of claim 14, wherein the summing is performed during pre-detection integration, wherein the pre-detection integration comprises a pre-detection interval.

16. The system of claim 15, wherein each respective time interval is 1 millisecond or less and the pre-detection interval is 20 milliseconds.

17. The system of claim 14, further comprising a switch array and a single channel RF downconverter between the processing circuit and the array of antenna elements.

18. The system of claim 14, wherein each respective time interval is less than 1 millisecond.

\* \* \* \* \*